United States Patent Office 3,166,537
Patented Jan. 19, 1965

3,166,537
CHROMIUM, TUNGSTEN OR MANGANESE OXIDE OLEFIN POLYMERIZATION CATALYST ACTIVATED WITH CARBON MONOXIDE AND ULTRAVIOLET LIGHT AND POLYMERIZATION THEREWITH
Robert Q. Gregg and Jack N. Finch, Bartlesville, Okla., assignors to Phillips Petroleum Company, a corporation of Delaware
No Drawing. Filed Nov. 17, 1960, Ser. No. 69,813
9 Claims. (Cl. 260—88.2)

This invention relates to the catalytic polymerization of polymerizable olefinic hydrocarbons to higher molecular weight products. In accordance with one aspect, this invention relates to an improved process for polymerizing olefins in the presence of a catalyst promoted by an oxide of at least one metal selected from chromium, tungsten and manganese. In accordance with another aspect, this invention relates to an improved process for the preparation of a catalyst comprising an oxide of at least one metal selected from chromium, tungsten and manganese that is a highly active polymerization catalyst.

The conversion of olefins to hydrocarbons of higher molecular weight by polymerization reactions is well known. In some instances, such polymerizations may be accomplished solely by the application of heat and pressure, but in many cases the use of a catalyst is desirable. In general, catalysts cause polymerizations to proceed at lower temperatures, decrease the number and types of polymeric products formed, and increase the yield of desired products. Many individual catalysts already have been found that are active for the polymerization of olefins. One very effective catalyst for the polymerization of olefins comprises a silica-alumina base promoted by an oxide of a metal selected from Group VIA (left hand subgroup of Group VI) of the Mendeléeff Periodic Table of elements. It has been established that no catalyst is the exact equivalent of any other catalyst and that products differing not only in molecular weight but also in molecular structure can be prepared through the use of different catalysts, or catalysts activated in a different manner, when polymerizing the same olefins. The present invention relates to an improved process for activating certain catalysts that are highly active for the polymerization of olefins.

Accordingly, an object of this invention is to provide an improved catalyst which is especially useful in the polymerization of olefins to higher molecular weight hydrocarbon products.

Another object of this invention is to provide an improved process for the preparation of such a catalyst.

A further object of this invention is to provide an improved polymerization process employing a highly active catalyst.

Other objects, aspects, as well as the several advantages of this invention will be apparent to those skilled in the art upon a further study of the specification and the appended claims.

In accordance with the present invention, we provide an improved process for preparing a highly active polymerization catalyst comprising a silica-alumina base promoted with an oxide of at least one metal selected from the group consisting of chromium, tungsten and manganese, which comprises calcining said catalyst with an oxygen-containing medium at an elevated temperature, and then subjecting said catalyst to electromagnetic radiation having a wave length in the range 0.125 to 0.80 micron (1,250 to 8,000 Angstrom units) while simultaneously contacting said catalyst with carbon monoxide at a temperature below said calcination temperature.

We have found, unexpectedly, that when the carbon monoxide treatment step is carried out at temperatures below the calcination temperature while simultaneously subjecting a chromium oxide- or tungsten oxide-containing catalyst to electromagnetic radiation having high intensity in the spectral region 0.25 to 0.40 micron (2,500 to 4,000 Angstrom units), the chromium oxide catalyst displays absorbance of infrared near 6.5 and 7.1 microns indicating the presence of irreversibly adsorbed carbon monoxide which we find to be a characteristic of the highly reactive catalysts of our invention. In addition, bands due to reversibly adsorbed carbon monoxide were observed for chromium oxide catalysts at 2185 and 2217 cm.$^{-1}$ and at 2058 and 2100 cm.$^{-1}$ for tungsten oxide catalysts.

We have also found that black manganese oxide does not form either reversible or irreversible species with carbon monoxide under the same condition utilized in forming the reversible species with the defined Group VIA metal oxides, but the simultaneous treatment with carbon monoxide and ultra violet irradition increases the activity of the catalyst in promoting the polymerization of olefins.

Also, in accordance with the present invention, we provide an improved process for the polymerization of polymerizable olefinic hydrocarbons to higher molecular weight products which comprises contacting an olefin under polymerizing conditions of temperature and pressure with a catalyst comprising a silica-alumina base promoted by an oxide of at least one metal selected from the group consisting of chromium, tungsten and manganese activated as set forth above.

When treating chromium oxide-containing catalysts in accordance with the invention with carbon monoxide, several species of reversible adsorption were observed with the metal oxides as well as at least two irreversible species. We cannot say with certainty what the nature of interaction is with the surface which gives rise to these species. However, we believe that classical reduction does not explain the reduction which is brought about by the treatment of our invention. Our observations lead us to favor postulation of the theory which considers the promoters as an impurity in the lattice of the catalyst base. The impurity can be thought of as being in solid solution in the silica-alumina. The combined treatment involving electromagnetic radiation, as defined, in the presence of carbon monoxide and at the optimum temperature for the metal oxide species selected sets up electrical fields about the impurity sites which on balance are in a reduced state compared to the original oxidized impurities. However, in any event, we do not wish to be limited to any particular theory of our invention.

The source of the electromagnetic radiation employed in the invention is limted only to those providing wave lengths in the range 0.125 to 0.8 micron (1,250 to 8,000 Angstrom units) and preferably in the wave length region of 0.25 to 0.40 micron (2,500 to 4,000 Angstrom units). Sources of radiation that are commercially available include mercury lamps and arcs, carbon arcs, hydrogen discharge tubes, tungsten lamps, etc.

The actual temperature at which the reduction step is carried out in accordance with the invention varies appreciably depending upon the particular metal oxide selected as promoter, and the like. However, as indicated previously, the temperature employed during the reduction step will usually be less than the temperature employed during the calcination step of the catalyst and will generally be of the order of 20 to 400° C.

The metal oxide catalyst ingredients employed in the present invention are selected from the group consisting of chromium, tungsten and manganese, or mixtures thereof. As indicated previously, the metal oxides are extended upon a silica-alumina base or support. The amount of metal, as the oxide, in the catalyst can range from 0.1 to 10 or more weight percent, preferably 0.25 to 3.5 weight percent.

The silica-alumina base employed in the invention can be prepared by any of the various conventional methods, including coprecipitation of the silica and alumina, and thereafter impregnation of the base with a metal compound readily convertible to the oxide upon calcination. Impregnation of the base can be effected before or after pelleting of the silica-alumina base. Other methods of preparing the catalyst, for example coprecipitation, can also be employed. The silica-alumina base can contain various proportions of these two constituents, but it is preferred to use a base in which the silica is in the major proportion. A very effective base consists of 90 percent silica and 10 percent alumina (by weight) particularly when promoted with chromium oxide. However, effective catalyst bases can be prepared containing from 2 to 15 percent alumina.

The catalyst employed in the invention can be prepared prior to the carbon monoxide and electromagnetic radiation treatment step by preparation methods known in the art, for example, direct mixing of solid components, impregnation, etc. In order to obtain optimum activity, it is preferred that the catalyst mixture comprising the metal oxide and silica-alumina be calcined prior to the carbon monoxide and electromagnetic radiation treatment of the invention at an elevated temperature by heating with an oxygen-containing stream, such as air, at a temperature in the range about 500 to about 700° C. for a period of 3 to 10 hours, or more, followed by a degassing step of about the same length of time at about 350 to about 500° C. in a vacuum. It is preferred that the oxygen-containing gas be substantially water-free.

Polymerization reactions contemplated by the present invention can be effected in any well known manner such as fixed bed, moving bed, fluidized bed, or any bed of particles suspended in a liquid reaction medium as in a stirred reactor.

The polymerization can be carried out in a batch, intermittent or continuous manner. Also, the polymerization products obtained will depend primarily upon the polymerization conditions employed and, generally, will include liquid, tacky and solid polymers.

The polymerization temperature employed can vary within a rather wide range depending on the other reaction conditions, the polymerizable olefinic hydrocarbon to be polymerized, and the products to be formed. In general, the temperature will not be much lower than about −20° C. or appreciably above about 250° C. The pressures employed will generally range from subatmospheric to as high as a few atmospheres. Quite often the pressure used is high enough to maintain the olefins in the liquid phase and, in a process in which a diluent is used, will be sufficient to maintain the diluent in the liquid phase.

Hydrocarbon diluents that can be used include the paraffins and/or cycloparaffins. The liquid hourly space velocity can be as high as about 20, but ordinarily a liquid hourly space velocity of less than about 10 is used in a liquid-phase process with a fixed bed of catalyst. However, conditions of temperature and pressure outside the above-noted ranges can be used depending upon the other reaction conditions and the products to be formed.

The catalysts of the present invention can be employed to effect the homopolymerization or copolymerization of polymerizable olefinic hydrocarbons. The charging stock to the polymerization process preferably comprises essentially a normally gaseous mono-olefinic hydrocarbon, mixtures of such hydrocarbons, and mixtures comprising said hydrocarbons and comonomers. The normally gaseous mono-olefins comprise ethylene, propylene and the butylenes. When comonomers are employed with the principal charging stock, their proportion may range between about 1 and about 25 percent by weight, based on the weight of the principal olefin charging stock, such as ethylene.

The present invention provides an improved process for the polymerization of aliphatic mono-1-olefins of 2 to 8 carbon atoms per molecule in which there is no branching nearer the double bond than the 4-position to form solid polymers employing a chromium oxide-silica-alumina catalyst containing hexavalent chromium activated in accordance with the present invention.

As indicated above, the polymerization can be effected with a fixed-bed catalyst or with a mobile catalyst prepared in accordance with the invention. A frequently preferred method of conducting the polymerization reaction comprises contacting the feed olefin with a slurry of the catalyst, for example, a comminuted chromium oxide catalyst, in suspension in the solvent or diluent. From about 0.01 to 10 weight percent of catalyst, based on weight of diluent, is ordinarily used. The catalyst can be maintained in suspension by a mechanical agitation device and/or by virtue of the velocity of the incoming feed or diluent. In this type of operation, a large portion of the product polymer remains associated with the catalyst, which is withdrawn from the reaction zone as a slurry. The polymer can be separated from the catalyst by dissolution in a solvent of the type described, usually with the aid of heat and agitation, and the stripped catalyst can be recycled and/or regenerated.

The combined electromagnetic radiation and carbon monoxide treatment step of the invention can be carried out in a separate vessel or in the polymerization reaction vessel or zone, if desired. The activation step of the invention is preferably carried out immediately prior to beginning polymerization whether carried out in a separate activation vessel or in the polymerization vessel so as to avoid exposing the activated catalyst to the atmosphere or other mediums that may at least partially deactivate the catalyst.

In order to illustrate the invention the following specific example are presented. It is to be understood that the specific conditions utilized are merely illustrative of desired and preferred conditions and are not to be interpreted as unnecessarily limiting the invention.

Each catalyst employed in Examples I–IV was molded into a one-inch disk weighing about 0.25 gram and having a thickness of approximately 300 microns. The disk was prepared by placing bulk catalyst in a mold and closing the mold with a pressure of about 35,000 p.s.i. at about 100° C. The catalyst disk was mounted in a slotted coiled heater which was suspended vertically in a water cooled infrared cell. The catalyst disks were found to transmit sufficient infrared in the range 2.0 to 7.5 microns (1600 to 4500 cm.$^{-1}$) for measurement with the instrument utilized. A cell equipped with calcium fluoride windows was used. A Chromel-Alumel thermocouple embedded in the heater coil permitted the temperature to be followed with a precision of about 1° C. The source of radiation was a General Electric 100 watt AH$_4$ mercury lamp with the glass envelope removed. Although the lamp envelope had a cut off point at 3000 Angstroms, considerably shorter ultraviolet radiation is produced with the envelope removed. In fact, some 2960 Angstrom radiation is transmitted with the envelope in place.

*Example I*

A bulk catalyst comprising a silica-alumina base having about 88 percent silica and 12 percent alumina to which chromium oxide had been added was prepared. The chromium oxide was incorporated into the base as chromium trioxide ($CrO_3$) and analysis indicated that the calcined material contained 2.34 percent chromium reported as the metal. After molding into disks the catalyst was calcined 4 hours in air at 550° C. and then transferred to the hot cell and heated for 4 hours under a vacuum of 10$^{-4}$ mm. of mercury. The system was then pumped overnight at room temperature. Before using, the catalyst was heated to 400° C. under vacuum, cooled to 250° C. and 65 mm. of carbon monoxide was admitted to the cell. The system was maintained at 250° C. for one hour and 15 minutes. An infrared scanning in the 2200 cm.$^{-1}$ region indicated weak absorbance at 2185 to 2190 cm.$^{-1}$. The system was evacuated and cooled to 35° C.; 1500 microns of ethylene was admitted which reduced to 700 microns in 3 minutes.

Example II

A second disk made from the calcined catalytic material of Example I was transferred to the hot cell and heated for 4 hours under a vacuum of 10$^{-4}$ mm. mercury. The catalyst was then cooled to 35° C. and treated with 100 mm. carbon monoxide for one hour. After evacuation, the infrared spectra at 2000 to 3000 cm.$^{-1}$ indicated no reaction had occurred.

Then 34 mm. of carbon monoxide was introduced and the catalyst was simultaneously irradiated with ultraviolet (lamp on with envelope removed) for one-half hour. On evacuation the spectral data indicated that a weak absorbance was present at 2185 cm.$^{-1}$. The catalyst was then irradiated in the presence of 100 mm. carbon monoxide for one hour. A very strong band was observed at 2185 cm.$^{-1}$ and a weak band at 2217 cm.$^{-1}$. Then 2000 microns of ethylene was admitted to the cell which reduced to 510 microns in 3 minutes. The sample now showed bands at 2925 and 2850 cm.$^{-1}$ indicating the presence of a high molecular weight polymer of ethylene.

Example III

A tungsten oxide promoted catalyst was prepared by adding 75 ml. of a solution containing 3 grams of $(NH_4)_6W_7O_{24} \cdot 6H_2O$ heated to 70–90° C. to effect solution to 25.4 grams of 90/10 silica-alumina made by Houdry Corporation. The material was dried at 110° C., soaked for 10 minutes and drained on a Buchner funnel, dried on a hot plate with continuous stirring and calcined at 500° C. for 5 hours in air, cooled to room temperature and fashioned into a catalyst disk by the method outlined above. The disk was transferred to the hot cell and heated for 4 hours under vacuum at 10$^{-4}$ mm. mercury. The cell was then pumped overnight at room temperature.

Before activation the catalyst was again heated to 400° C. under vacuum, cooled to 35° C., and 108 mm. of carbon monoxide were added to the cell. After one hour a scanning in the region of about 2200 cm.$^{-1}$ indicated no reaction had taken place. With 108 mm. carbon monoxide in the cell, the catalyst temperature was raised to 250° C., maintained at that temperature for one hour, and cooled to 35° C. in the presence of the carbon monoxide. No absorbance at the carbon monoxide frequencies was apparent. The catalyst was again contacted with 108 mm. of carbon monoxide at 35° C. with the lamp turned on for one hour. No carbon monoxide bands were produced, but there was some residual absorption between 2000 and 2100 cm.$^{-1}$. Irradiation for ½ hour at 115° C. in carbon monoxide followed by cooling to 35° C. in carbon monoxide did not produce carbon monoxide frequencies belonging to an adsorbed species. Irradiation for one hour at 350° C. followed by cooling to 35° C. also failed to produce the carbon monoxide bands belonging to an adsorbed species.

Finally, the catalyst was irradated for one hour at 400° C. and cooled in 45 minutes to 35° C. The ultraviolet lamp remained on during the cooling process. The spectrum showed absorbance at 2058 cm.$^{-1}$. The carbon monoxide was reduced to 3 mm., whereupon a strong band was observed at 2058 cm.$^{-1}$ and a weak band was observed at 2100 cm.$^{-1}$ indicating that there was indeed absorption of carbon monoxide on the catalyst. Both bands pumped off when the cell was evacuated to 10$^{-4}$ mm. for 5 minutes. The catalyst was contacted with 45 mm. of ethylene. A polymeric spectrum was obtained with peak absorbance at the C–H stretching frequencies at 2960 cm.$^{-1}$ and 2865 cm.$^{-1}$ and a shoulder at 2925 cm.$^{-1}$, indicating a paraffinic structure. This material was a polymeric product.

Example IV

Added to 75 ml. of water was 14 ml. of a 50% manganese nitrate $[Mn(NO_3)_2]$ solution. This solution was then placed on 26 grams of a 90/10 silica-alumina base and stirred for one-half hour. The solution was decanted and the catalyst, washed three times with water, collected on a filter and dried at 104° C. The wash removed much of the manganese oxide and produced a light colored product. The catalyst mixture was molded into a 1-inch disk weighing about 0.2 gram, heated four hours in air at 550° C. and transferred hot to the catalyst cell. In the cell the catalyst temperature was adjusted to 400° C. at which temperature the catalyst was maintained for two to three hours under high vacuum. The catalyst cell was then cooled and pumped overnight.

The next day the catalyst temperature was again elevated to 400° C. with the circulating water in the catalyst jacket at 90° C. and with a cold trap in the vacuum system. The color of the catalyst was essentially black although it was much lighter than subsequent catalyst formed by omission of the washing steps. The catalyst was treated with 108 mm. of carbon monoxide after the catalyst had cooled to 35° C. No new absorption bands were produced by this treatment. Likewise, two hours of treatment with ultraviolet light failed to produce new bands in the spectrum from the catalytic material. When this catalyst was contacted with 1660 microns of mercury ethylene pressure, polymer was slowly produced as evidenced by the increased absorption and consequent enhancement of the 2925 and 2850 cm.$^{-1}$ bands. Additional evidence of polymerization was the reduction of ethylene pressure at the rate of about 170 microns per hour. No additional bands were observed as the polymerization proceeded.

Example V

A second catalyst disk was prepared in a manner similar to that described for the disk of Example IV except that no washing of the catalyst was utilized. The color of the catalyst was considerably darker than the catalyst prepared in Example V when this catalyst disk had been activated and treated with 108 mm. of carbon monoxidee at 35° C. When ultraviolet irradiation was applied to the activated catalyst for two hours in the presence of carbon monoxide, no reaction with olefins could be detected. This treatment produces reversible bands in the catalyst spectrum. Heating at 250° C. for one hour did not produce irreversible bands in the 5.5 to 7.5 micron range. No polymerization activity could be detected and no flash was observed when oxygen gas was admitted to the catalyst cell.

Example VI

This catalyst was activated in the same manner as Example IV except no carbon monoxide treatment was applied after the heat treatment of the catalyst.

Upon addition of 1390 microns of mercury pressure of ethylene at 35° C. the ethylene pressure reduced to 1370 microns after 40 minutes. Very little polymer spectra was observed. The ethylene pressure was increased to 108 mm. mercury and the temperature maintained at 35° C. and after 15 minutes structure was slowly building up on the polymerization spectra. A repeat run over the same conditions also slowly built up the characteristic 2925 and 2850 cm.$^{-1}$ bands.

This example illustrates that carbon monoxide treatment makes the catalyst more active although the catalyst bands for either the reversible or irreversible species were not observed.

As will be evident to those skilled in the art, many variations and modifications of this invention can be practiced in view of the foregoing disclosure. Such variations and modifications are clearly believed to come within the spirit and scope of the invention.

We claim:
1. A process for the preparation of a polymer of ethylene which comprises contacting a monomeric mixture containing at least 75 weight percent ethylene, the remaining monomer being a higher molecular weight 1-olefin, with an activated catalyst under polymerization conditions of temperature and pressure, said catalyst before activation consisting essentially of a silica-alumina base promoted with from 0.1 to 10 weight percent of an oxide of manganese, activation of said catalyst before use thereof in said polymerization being effected by calcining said catalyst by heating at an elevated temperature above about 500° C. with an oxygen-containing medium, and treating said calcined catalyst with electromagnetic radiation having a wave length spectrum in the range 0.25 to 0.40 micron (2500 to 4000 Angstrom units) while simultaneously contacting said catalyst with carbon monoxide at a temperature below said calcination temperature to produce said activated catalyst.

2. A process for preparing an active polymerization catalyst which comprises the steps of forming a catalyst composite by incorporating from 0.1 to 10 weight percent of a manganese oxide with a silica-alumina base, calcining said composite by heating with an oxygen-containing medium at an elevated temperature above about 500° C., and subjecting said calcined composite to electromagnetic radiation having a wave length in the range 0.25 to 0.40 microns while simultaneously contacting said composite with carbon monoxide at a temperature below said calcination temperature to form said active catalyst.

3. The activated catalyst prepared according to claim 2.

4. A process for the preparation of a polymer of ethylene which comprises contacting a monomeric mixture containing at least 75 weight percent ethylene, the remaining monomer being a higher molecular weight 1-olefin, with an activated catalyst under polymerization conditions of temperature and pressure, said catalyst before activation consisting essentially of a silica-alumina base promoted with from 0.1 to 10 weight percent of an oxide of tungsten, activation of said catalyst before use thereof in said polymerization being effected by calcining said catalyst by heating at an elevated temperature above about 500° C. with an oxygen-containing medium, and treating said calcined catalyst with electromagnetic radiation having a wave length spectrum in the range 0.25 to 0.40 micron (2500 to 4000 Angstrom units) while simultaneously contacting said catalyst with carbon monoxide at a temperature below said calcination temperature to produce said activated catalyst.

5. A process for preparing an active polymerization catalyst which comprises the steps of forming a catalyst composite by incorporating from 0.1 to 10 weight percent of a tungsten oxide with a silica-alumina base, calcining said composite by heating with an oxygen-containing medium at an elevated temperature above about 500° C., and subjecting said calcined composite to electromagnetic radiation having a wave length in the range 0.25 to 0.40 micron while simultaneously contacting said composite with carbon monoxide at a temperature below said calcination temperature to form said active catalyst.

6. The activated catalyst prepared according to claim 5.

7. A process for the preparation of a polymer of ethylene which comprises contacting a monomeric mixture containing at least 75 weight percent ethylene, the remaining monomer being a higher molecular weight 1-olefin, with an activated catalyst under polymerization conditions of temperature and pressure, said catalyst before activation consisting essentially of a silica-alumina base promoted with from 0.1 to 10 weight percent of an oxide of chromium, activation of said catalyst before use thereof in said polymerization being effected by calcining said catalyst by heating at an elevated temperature above about 500° C. with an oxygen-containing medium, and treating said calcined catalyst with electromagnetic radiation having a wave length spectrum in the range 0.25 to 0.40 micron (2500 to 400 Angstrom units) while simultaneously contacting said catalyst with carbon monoxide at a temperature below said calcination temperature to produce said activated catalyst.

8. A process for preparing an active polymerization catalyst which comprises the steps of forming a catalyst composite by incorporating from 0.1 to 10 weight percent of a chromium oxide with a silica-alumina base, calcining said composite by heating with an oxygen-containing medium at an elevated temperature above about 500° C., and subjecting said calcined composite to electromagnetic radiation having a wave length in the range 0.25 to 0.40 micron while simultaneously contacting said composite with carbon monoxide at a temperature below said calcination temperature to form said active catalyst.

9. In a process for the preparation of a highly active polymerization catalyst composite consisting of a silica-alumina base containing a major proportion of silica promoted by from 0.1 to 10 weight percent of an oxide of at least one metal selected from the group consisting of chromium, tungsten and manganese, by heating said composite with air at a calcination temperature ranging from 500° to 700° C. the improvement comprising activating said composite by irradiating same with electromagnetic waves ranging from 0.125 to 0.80 micron in length and having high intensity in the spectral region 0.25 to 0.40 micron while simultaneously contacting said composite with carbon monoxide at a temperature below said calcination temperature.

References Cited in the file of this patent
UNITED STATES PATENTS

| | | |
|---|---|---|
| 2,692,257 | Zletz | Oct. 19, 1954 |
| 2,734,027 | Nickerson et al. | Feb. 7, 1956 |
| 2,825,721 | Hogan et al. | Mar 4, 1958 |
| 2,924,561 | Schmerling | Feb. 9, 1960 |

FOREIGN PATENTS

| | | |
|---|---|---|
| 1,217,093 | France | Dec. 7, 1959 |